(12) United States Patent
Larsèn

(10) Patent No.: US 12,322,993 B2
(45) Date of Patent: Jun. 3, 2025

(54) BATTERY CHARGER WITH A PLURALITY OF SECONDARY TRANSFORMER CIRCUITS

(71) Applicant: Husqvarna AB, Huskvarna (SE)

(72) Inventor: Martin Larsèn, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 969 days.

(21) Appl. No.: 17/291,448

(22) PCT Filed: Nov. 12, 2019

(86) PCT No.: PCT/SE2019/051139
§ 371 (c)(1),
(2) Date: May 5, 2021

(87) PCT Pub. No.: WO2020/111998
PCT Pub. Date: Jun. 4, 2020

(65) Prior Publication Data
US 2022/0006316 A1    Jan. 6, 2022

(30) Foreign Application Priority Data
Nov. 27, 2018   (SE) .................................... 1851468-7

(51) Int. Cl.
*H02J 7/02*     (2016.01)
*H02J 7/00*     (2006.01)
(52) U.S. Cl.
CPC ............ *H02J 7/02* (2013.01); *H02J 7/00047* (2020.01); *H02J 2207/20* (2020.01)
(58) Field of Classification Search
CPC ...... H02J 7/02; H02J 7/00047; H02J 2207/20; H02J 7/00041
See application file for complete search history.

(56) References Cited
U.S. PATENT DOCUMENTS 2,980,842 A    4/1961   Medlar
3,809,993 A    5/1974   Wheeler
(Continued)

FOREIGN PATENT DOCUMENTS

CN    202940628 U    5/2013
CN    103532187 A    1/2014
(Continued)

OTHER PUBLICATIONS

"Difference Between Series & Parallel Transformer", In Electrical engineering Community powered by WordPress, Retrieved From http://engineering.electrical-equipment.org/forum/general-discussion/difference-between-series-parallel-transformer, Jun. 21, 2013, 4 Pages.

(Continued)

*Primary Examiner* — Nha T Nguyen
(74) *Attorney, Agent, or Firm* — Burr & Forman LLP

(57) ABSTRACT

The present disclosure relates to a battery charger (100). The battery charger (100) includes a charging circuit (110) which comprises a primary transformer circuit (200) connectable to a power source (120) to receive charging current from the power source (120) and a plurality of secondary transformer circuits (210,220). At least one of the plurality of secondary circuits (210, 220) is arranged to cooperate with the primary transformer circuit (200) to provide a charging voltage to at least one battery (130), and the plurality of secondary transformer circuits (210,220) are connected in series with each other. A first secondary transformer circuit (210) is configured to provide a first charging voltage to the at least one battery (130) by means of a first associated output (10). At least one second secondary transformer circuit (220) is configured to provide an additive charging voltage, which is added to the first charging voltage from the first secondary transformer circuit (210) to form a second charging voltage.

(Continued)

The second charging voltage is provided to the at least one battery (130) by means of a second associated output (20).

15 Claims, 2 Drawing Sheets

(56) References Cited

U.S. PATENT DOCUMENTS

| | | | |
|---|---|---|---|
| 5,821,730 | A | 10/1998 | Drapkin |
| 11,070,076 | B2 * | 7/2021 | Zhang ................ H02J 7/00036 |
| 11,222,750 | B1 * | 1/2022 | Macaluso ............... B60L 53/14 |
| 2003/0038612 | A1 * | 2/2003 | Kutkut ...................... H02J 7/02 |
| | | | 320/140 |
| 2014/0197780 | A1 * | 7/2014 | Imamura ................... H02J 7/00 |
| | | | 320/107 |
| 2014/0265575 | A1 | 9/2014 | Shih et al. |
| 2016/0268834 | A1 | 9/2016 | Satyamoorthy et al. |
| 2017/0093290 | A1 * | 3/2017 | Qiu ....................... H02M 3/335 |
| 2017/0194813 | A1 * | 7/2017 | Guo .......................... H02J 9/06 |
| 2017/0279287 | A1 * | 9/2017 | Solodovnik ............. H02M 7/06 |
| 2018/0226182 | A1 * | 8/2018 | Fe ......................... H01F 27/245 |
| 2018/0337543 | A1 * | 11/2018 | Ji .......................... H02J 7/0071 |

FOREIGN PATENT DOCUMENTS

| | | |
|---|---|---|
| CN | 105191055 A | 12/2015 |
| CN | 205882808 U | 1/2017 |
| CN | 106953393 A | 7/2017 |
| CN | 208112310 U | 11/2018 |
| GB | 563491 A | 8/1944 |
| GB | 1296595 A | 11/1972 |

OTHER PUBLICATIONS

International Search Report and Written Opinion in the International Application No. PCT/SE2019/051139 mailed Jan. 22, 2020.

Office Action and Search Report for Swedish Application No. 1851468-7 mailed on Jun. 12, 2019.

"RadioShack Corp., ""Enercell® Universal Li-ion, Ni—Cd and Ni-MH Charger"", Retrieved From https://web.archive.org/web/20141115213108/http://www.radioshack.com/enercell-universal-li-ion-ni-cd-and-ni-mh-charger/2300972.html, 2014, 2 Pages".

* cited by examiner

BATTERY CHARGER WITH A PLURALITY OF SECONDARY TRANSFORMER CIRCUITS

TECHNICAL FIELD

This disclosure relates to a battery charger. The battery charger may be used for re-charging at least one re-chargeable battery, wherein the battery charger may output different charging voltages to the at least one re-chargeable battery depending on which associated output the at least one re-chargeable battery is connected to.

BACKGROUND

An electric battery is a device comprising one or more electrochemical cells, in which chemical energy is converted into electricity. The battery may be used as a power source and may be provided with external connections in order to power electrical appliances.

A rechargeable battery is a type of electrical battery which can be charged, discharged, and recharged many times. This is in contrast to a disposable battery, which is supplied fully charged and discarded after use. There are a lot of different types of re-chargeable batteries and these different types of batteries may provide different voltage levels to the electrical appliances.

In order to re-charge a re-chargeable battery, a battery charger (also known as a recharger) is generally utilized. A battery charger is a device that may be used to provide energy into a re-chargeable battery by forcing an electric current through it. A battery charger thus applies, for a certain amount of time, an appropriate electric current to the re-chargeable battery. The electric current is known as charging current, and the value of the required charging current generally depends on the type of battery to be charged.

Generally, a battery charger may be designed to cover one battery voltage level. Alternatively, a battery charger may also be designed to cover a range of voltage levels. A battery charger designed to cover a range of voltage levels may be advantageous since a more flexible charger may be provided. The same battery charger may thus be used in order to charge batteries of different types and consequently, the need for several battery chargers may be reduced.

SUMMARY

The inventor of the various embodiments of the present invention has realized that there exist drawbacks with battery chargers that can provide a range of output voltages such as, for example, nominal system voltage (V) 36V and 72V, or 36V and 58V. One drawback is that such a battery charger may need a high rating both on current and voltage in order to provide its maximum power both at the lower voltage level and at the higher voltage level. Consequently, the cost efficiency may for example be low and there may be a cost drawback.

Another drawback with battery chargers that can provide a range of output voltages may arise when they are used with battery systems for outdoor power tools. Most battery systems for outdoor power tools on the market are on the Safety Extra Low Voltage (SELV) class. SELV may, interchangeably, be referred to as being an abbreviation for Separated (from earth) Extra Low Voltage. Extra Low Voltage (ELV) is an electricity supply voltage in a range which carries a low risk of dangerous electrical shock. The International Electrotechnical Commission (IEC) defines a SELV system as "an electrical system in which the voltage cannot exceed ELV under normal conditions, and under single-fault conditions, including earth faults in other circuits". A SELV system has an output voltage below 42.4V, and may thus be considered safe to touch without any risk of electric shock. However, if the battery charger also should supply a voltage that is above the SELV voltage class, the terminals should generally not be accessible for the user. As these terminals should not be accessible for the user, there may be a problem with the compatibility with 36V battery interface. Hence, there is a need for a battery charger for use with re-chargeable batteries which may overcome these drawbacks.

In view of the above, it is therefore a general object of the aspects and embodiments described throughout this disclosure to provide a solution for providing an improved battery charger, for example, for use with at least one re-chargeable battery. It is desirable that the battery charger may have a high power conversion efficiency, while still providing a cost efficient solution.

This general object has been addressed by the appended independent claim. Advantageous embodiments are defined in the appended dependent claims.

According to a first aspect, there is provided battery charger.

The battery charger may optionally be used for re-charging at least one re-chargeable battery, wherein the battery charger may output different charging voltages to the at least one re-chargeable battery depending on which associated output the at least one re-chargeable battery is connected to.

In one exemplary embodiment, the battery charger includes a charging circuit, which comprises a primary transformer circuit connectable to a power source to receive charging current from the power source, and a plurality of secondary transformer circuits. At least one of the plurality of secondary circuits is arranged to cooperate with the primary transformer circuit to provide a charging voltage to at least one battery, and the plurality of secondary transformer circuits are connected in series with each other. A first secondary transformer circuit is configured to provide a first charging voltage to the at least one battery by means of a first associated output, and at least one second secondary transformer circuit is configured to provide an additive charging voltage, which is added to the first charging voltage from the first secondary transformer circuit to form a second charging voltage. The second charging voltage is provided to the at least one battery by means of a second associated output.

In one embodiment, the first charging voltage is of a Safety Extra Low Voltage, SELV, class.

In one embodiment, the current rating at the first associated output of the first secondary transformer circuit is the same as the current rating at the second associated output of the at least one second secondary transformer circuit. In one alternative embodiment, the same Volt-Ampere, VA, ratings are used on the first and second associated outputs of the plurality of secondary transformer circuits as for the primary transformer circuit.

In one embodiment, the battery charger further comprises a charge control circuit connected to the charging circuit. The charge control circuit is arranged to identify which of said associated output the at least one battery is connected to. The charge control circuit may for example be arranged to identify which of said associated output the at least one battery is connected to by communication with the at least one battery. Alternatively, the charge control circuit may be arranged to identify which of said associated output the at least one battery is connected to by sensing where battery voltage is present.

In one embodiment, the charge control circuit is arranged to use voltage feedback from the at least one second secondary transformer circuit when the at least one battery is identified to be connected to the second associated output.

In one embodiment, the battery charger is arranged to keep the voltage level at the first associated output within a Safety Extra Low Voltage, SELV, level, when the at least one battery is identified to be connected to the second associated output.

In one embodiment, the charge control circuit is arranged to use voltage feedback from the first secondary transformer circuit when the at least one battery is identified to be connected to the first associated output.

In one embodiment, the charging circuit further comprises regulating means. Said regulating means is connected, and shared, between the first secondary transformer circuit and at least one of the said at least one secondary transformer circuit. Said shared regulating means may for example be at least one of an output fuse, a safety output control relay and a current shunt.

In one embodiment, the battery charger is based on AC/DC power conversion.

In one embodiment, the battery charger is based on DC/DC power conversion.

In one embodiment, the battery charger is arranged for use with re-chargeable lithium ion batteries.

Some of the above embodiments eliminate or at least reduce the drawbacks discussed earlier in this disclosure. A battery charger is thus provided which may provide different voltage levels with high power conversion efficiency and cost efficiency. By providing a battery charger with a plurality of secondary transformer circuits which are connected in series, it is possible to provide the different voltage levels, while still providing a safe solution which may ensure that a user may not be exposed to the risk of electric shock, regardless of which voltage level that is output to a connected at least one re-chargeable battery.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
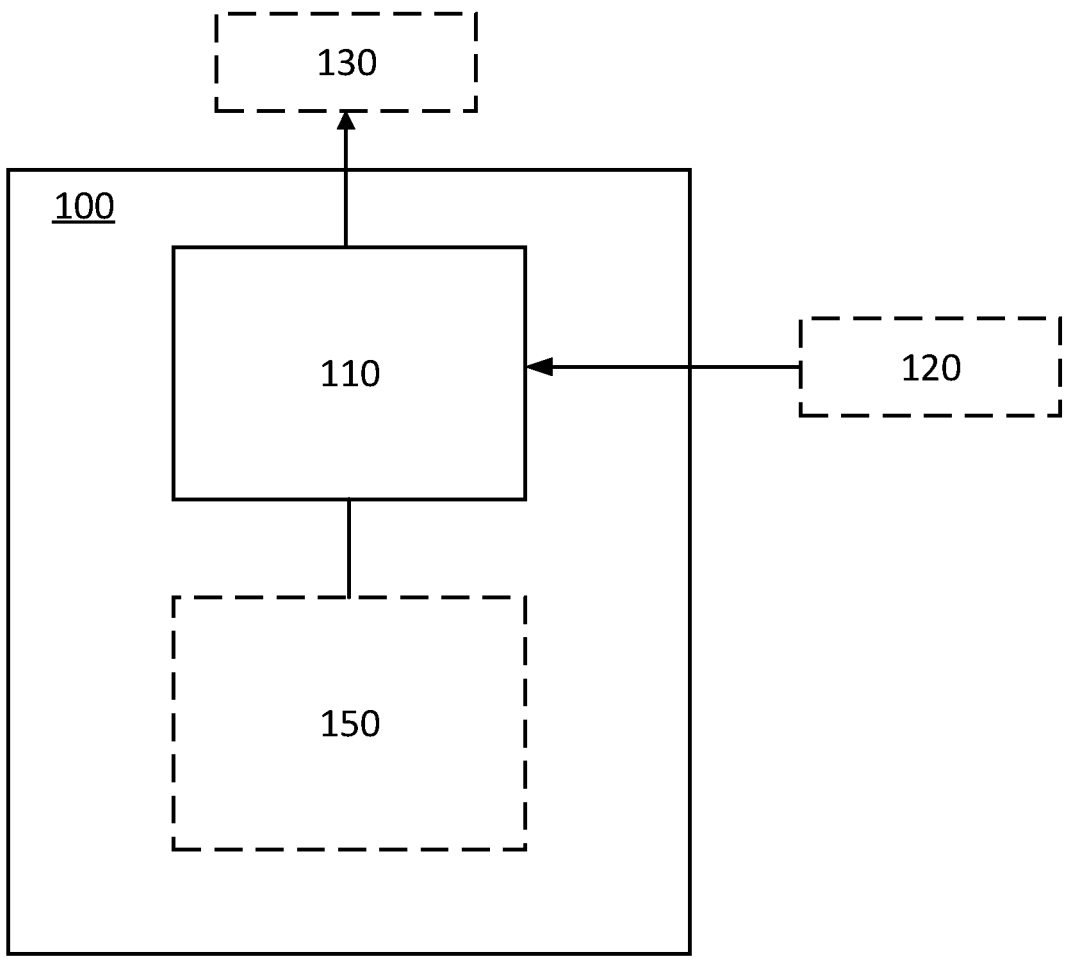
FIG. 1 shows a schematic overview of a battery charger.
Figure 2:
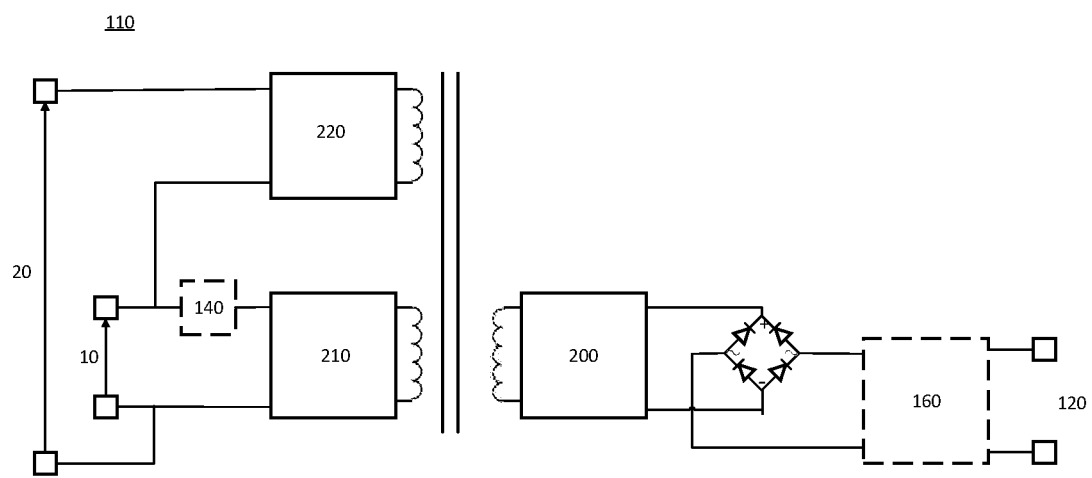
FIG. 2 shows a schematic overview of a charging circuit.

The disclosure presented herein concerns a battery charger. With reference to FIGS. 1 and 2, a first embodiment according to a general aspect will now be described. FIG. 1 illustrates a schematic overview of a battery charger and FIG. 2 illustrates a schematic view of a charging circuit which may be included in a battery charger such as the one illustrated in FIG. 1.

According to the general aspect, the battery charger may include a charging circuit 110. The charging circuit 110 may be an electric circuit that may extend from a charging source, or a power source 120, to at least one re-chargeable battery 130. The charging circuit 110 may thus provide energy into the at least one re-chargeable battery 130 by forcing an electric current through the at least one re-chargeable battery 130. The at least one re-chargeable battery 130 may comprise one or several re-chargeable batteries, wherein each re-chargeable battery 130 may comprise one or multiple battery cells.

As illustrated in FIG. 2, the charging circuit 110 may comprise a primary transformer circuit 200 and a plurality of secondary transformer circuits 210, 220. FIG. 2 illustrates two secondary transformer circuits 210, 220, but it should be appreciated that the general embodiment is not limited to two secondary transformer circuits 210, 220, the charging circuit 110 may comprise any number of secondary transformer circuits as long as there are at least two secondary transformer circuits.

The primary transformer circuit 200 may be connectable to the power source 120 to receive a charging current from the power source 120. At least one of the plurality of secondary circuits 210, 220 may be arranged to cooperate with the primary transformer circuit 200 to provide a charging voltage to the at least one battery 130. The plurality of secondary transformer circuits 210, 220 may be connected in series with each other.

Out of the plurality of secondary transformer circuits 210, 220, a first secondary transformer circuit 210 may be configured to provide a first charging voltage to the at least one battery 130 by means of a first associated output 10. At least one second secondary transformer circuit 220 may be configured to provide an additive charging voltage, which is added to the first charging voltage from the first secondary transformer circuit 210 to form a second charging voltage. The second charging voltage is provided to the at least one battery 130 by means of a second associated output 20.

The associated outputs 10, 20 is where the at least one battery 130 may be received by the battery charger 100 when the at least one battery 130 is re-charged. As described above, depending on which of the associated output 10, 20 the at least one battery 130 is received, different charging voltages may be provided to the at least one battery 130.

A standard single voltage charger may normally comprise one secondary transformer circuit. However, by using a plurality of secondary transformer circuits 210, 220 connected in series, it may be possible to provide a plurality of different voltage outputs to the at least one battery 130 in a cost efficient way. It may be possible to achieve the voltage outputs in a way that does not require a high rating both on current and voltage in order to provide maximum power at the provided voltage levels.

The at least one second secondary transformer circuit 220 may share the same flux from the primary transformer circuit 200 and as the plurality of secondary transformer circuits 210, 220 may be connected in series with each other, a higher output voltage may be attained. The at least one secondary transformer circuit 220 may provide an additional voltage, which may be added to the first charging voltage, provided by the first secondary transformer circuit 210, and thus, a higher output voltage may be provided. Accordingly, different types of batteries, which may have different voltage levels, may be re-charged by the same battery charger 100. For example, the battery charger 100 may be designed to give an additional voltage of 25.2V or 42V to charge six or ten extra serially connected battery cells. Thus, a battery charger 100 that may provide different voltage levels with high power conversion efficiency and cost efficiency is provided.

The design of the primary transformer circuit 200 may differ depending upon the type of power converter used and the present disclosure is not limited thereto. The primary transformer circuit 200 may, for example, be designed to realize a LLC (referring to 'Inductor-Inductor-Capacitor') resonant converter, a phase-shifted full bridge converter or a flyback converter. According to one embodiment, the output voltage and current of the battery charger may be controlled by the voltage and current applied to the primary transformer circuit 200. The voltage and current applied to the primary transformer circuit 200 may be created using a pulse—with modulation technique suitable for the type of power converter used. The primary transformer circuit 200 may, for example, with the selected pulse-width modulation technique, be switched with a frequency of approximately 100 kHz. However, the switching frequency may be higher, but it may also be lower.

Also the design of the secondary transformer circuits 210, 220 may differ depending upon the type of power converter used and the present disclosure is not limited thereto. The secondary transformer circuits 210, 220 may, for example, comprise filters and rectifiers. The secondary transformer circuits 210, 220 may, in some embodiments, be a passive circuit. The secondary transformer circuits 210, 220 may also, in some embodiments, be an actively controlled circuit comprising e.g. synchronous rectification.

In one embodiment, the first charging voltage may be of a Safety Extra Low Voltage, SELV, class. Thus, the first secondary transformer circuit 210 may provide a charging voltage below 42.4V. As the charging voltage may be below 42.4V, the terminals associated with the first associated output 10 may be considered safe to touch without risk of electric shock. Furthermore, as the at least one second secondary transformer circuit 220 may be configured to provide an additive voltage, which is added to the first charging voltage, it may be possible to provide a battery charger 100 that may provide a first charging voltage within a SELV level and a second charging voltage that may be above the SELV level. Alternatively, if the additive voltage provided by the second secondary transformer circuit 220 is small, it may be possible to obtain a battery charger 100 that may provide both first and second charging levels of the SELV class. Thus, a flexible battery charger 100 may be achieved.

Figure 3A:
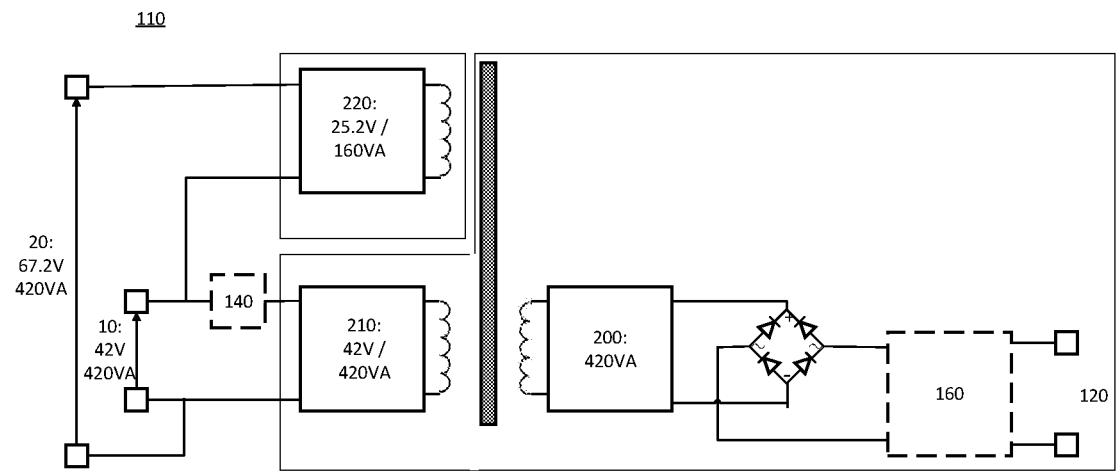
FIG. 3A shows a schematic overview of a charging circuit according to one embodiment.

In one embodiment, as illustrated in FIG. 3A, the same Volt-Ampere, VA, ratings may be used on the first and second associated outputs 10, 20 of the plurality of secondary transformer circuits 210, 220 as for the primary transformer circuit 200. The VA rating may be determined by the number of turns and wire diameter of transformer circuits 210, 220. According to this embodiment, when using the same VA ratings, it may be possible to achieve full effect at the associated output 10. The first secondary transformer circuit 210 may be slightly underutilized when the at least one battery 130 is connectable to the second associated output 20.

Another possible advantageous effect, provided by the previous described embodiment illustrated in FIG. 3A, is that the capability of the battery charger 100 may be increased in a cost efficient way. The ratings of the at least one second secondary transformer circuit 220 may be low while the capability of the battery charger 100 may be increased. For example, the at least one second secondary transformer circuit 220 may only require a 25.2V/160VA rating in order to increase the capability of the battery charger 100 from 42V/420 VA to 67.2V/420VA.

Figure 3B:
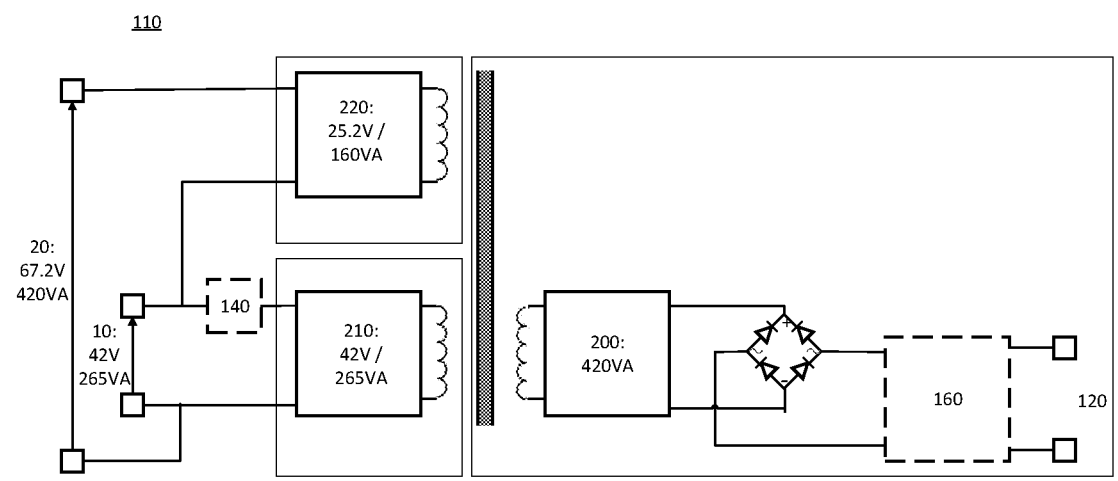
FIG. 3B shows a schematic overview of a charging circuit according to one embodiment.

In one alternative embodiment, as illustrated in FIG. 3B, the current rating at the first associated output 10 of the first secondary transformer circuit 210 may be the same as the current rating at the associated second output 20 of the at least one second secondary transformer circuit 220. Thereby different VA ratings may be given at the associated outputs 10, 20, and the total VA rating that may be achieved at the second associated output 20 may match the primary transformer circuit 100. The primary transformer circuit 200 may according to this embodiment be slightly underutilized when the at least one battery 130 is connectable to the first associated output 10.

Which one of the two previous described embodiments that is preferred, may depend on the voltage combination that is desirable to provide by the battery charger 100. For example, the first embodiment, which may use the same VA ratings on the associated outputs 10, 20 as for the primary transformer circuit 200, may be preferred if the battery charger 100 provides maximum 42V and 110V, respectively, on the associated first and second outputs 10, 20. However, the second embodiment may, for example, be preferred if the battery charger 100 provides maximum 42V and 60V, respectively, on the associated first and second outputs 10, 20.

In one embodiment, the battery charger 100 may further comprise a charge control circuit 150 connected to the charging circuit 110. This is illustrated in FIG. 1. The charge control circuit 150 may be arranged to identify which of said associated output 10, 20 the at least one battery 130 is connected to. By identifying which of said associated output that the at least one battery 130 is connected to, it may be possible to utilize the battery charger 100 in a more efficient way and it may be possible to adapt the re-charging of the at least one battery 130 in a more convenient way in accordance with the associated output 10, 20.

The charge control circuit 150 may be arranged to identify which of said associated output 10, 20 the at least one battery 130 is connected to in several different ways. For example, the charge control circuit 150 may be arranged to identify which of said associated output 10, 20 the at least one battery 130 is connected to by communication with the at least one battery 130. This may require that the at least one battery 130 is a so called "smart battery" and comprises some sort of electronic device or chip that can communicate with the battery charger 100 about battery characteristics and condition. Accordingly, this solution may provide a lot of possibilities of how to utilize the information provided by the at least one battery 130.

Alternatively, the charge control circuit 150 may be arranged to identify which of said associated output 10, 20 the at least one battery 130 is connected to by sensing where the battery voltage is present. This solution may be simpler, and cheaper, to realise in some aspects, and furthermore, this solution may not place excessive demands on the at least one battery 130.

In still one alternative embodiment, the charge control circuit 150 may be arranged to identify which of said associated output 10, 20 the at least one battery 130 is connected to by any of the two described embodiments. The charge control circuit 150 may thus be arranged to choose the appropriate way of identifying the at least one battery 130 depending on which type of battery that is received by the battery charger 100 at the first and second associated output 10, 20.

In one embodiment, the charge control circuit 150 may be arranged to use voltage feedback from the at least one second secondary transformer circuit 220 when the at least one battery 130 is identified to be connected to the second associated output 20. The voltage feedback may be used to control the charging of the at least one battery 130 which is received at the second associated output 20. Thus, it may be possible to control the rate at which the at least one battery 130 should be re-charged. It may be possible to control the charging current added to the at least one battery 130 and it may be possible to prevent overcharging, which might reduce battery performance or lifespan. The charge control circuit may, for example, regulate and control the charging current and the output voltage by controlling the switching of the primary transformer circuit 200.

Additionally or alternatively, the charge control circuit 150 may, according to some embodiments, be arranged to use voltage feedback from the primary transformer circuit 200. The voltage feedback may be used for power flow control in order to control the charging of the at least one battery 130 which is received at any of the associated outputs 10, 20.

In one embodiment, the battery charger 100 may be arranged to keep the voltage level at the first associated output 10 within a Safety Extra Low Voltage, SELV, level, when the at least one battery 130 is identified to be connected to the second associated output 20. Accordingly, some extra safety margin may be designed into the battery charger 100. The voltage output on the first associated output 10 may thus never exceed SELV level when voltage feedback from the at least one second secondary transformer circuit 220 is used to control the charge voltage. Consequently, a safer battery charger 100 may be achieved, which may assure that a user will not be exposed to the risk of electric shock when touching the associated output 10. Furthermore, according to this embodiment, it does not matter whether the terminals of the first associated out 10 may be accessible to a user or not, and the problem of compatibility with battery interfaces, as described earlier, may be solved.

In one embodiment, the charge control circuit 150 may be arranged to use voltage feedback from the first secondary transformer circuit 210 when the at least one battery 130 is identified to be connected to the first associated output 10. The voltage feedback may be used to control the charging of the at least one battery 130 which is received at the first associated output 10. Thus, it may be possible to control the rate at which the at least one battery 130 should be re-charged. It may be possible to control the charging current added to the at least one battery 130 and it may be possible to prevent overcharging, which otherwise might reduce battery performance or lifespan.

In one embodiment, the charging circuit 110 may further comprise regulating means 140. Said regulating means 140 may be connected, and shared, between the first secondary transformer circuit 210 and at least one of the said at least one secondary transformer circuit 220. Such regulating means 140 may for example be at least one of an output fuse, a safety output control relay and a current shunt. By sharing regulating means 140 between the first secondary transformer circuit 210 and at least one of the said at least one secondary transformer circuit 220, it may be possible to reduce the necessary hardware. This may in turn reduce the needed space for hardware components and/or reduce cost.

In one embodiment, the battery charger 100 may be based on AC/DC power conversion. In another embodiment, the battery charger 100 may be based on DC/DC power conversion.

In one advantageous embodiment, the battery charger 100 may be arranged for use with re-chargeable lithium ion batteries. A lithium ion battery, or Li-ion battery, is a type of rechargeable battery in which lithium ions move from the negative electrode to the positive electrode during discharge and back when charging. It may be advantageous to provide a battery charger 100 arranged for use with re-chargeable Li-ion batteries as Li-ion batteries may provide high energy density and a relatively low self-discharge rate compared to other rechargeable cells.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:
1. A battery charger, wherein the battery charger includes a charging circuit which comprises:
 a primary transformer circuit connectable to a power source to receive charging current from the power source; and
 a plurality of secondary transformer circuits, wherein at least one of the plurality of secondary circuits is arranged to cooperate with the primary transformer circuit to provide a charging voltage to at least one battery, and wherein the plurality of secondary transformer circuits are connected in series with each other; and wherein
 a first secondary transformer circuit is configured to provide a first charging voltage to the at least one battery by means of a first set of terminals defining a first output, and at least one second secondary transformer circuit is configured to provide an additive charging voltage, which is added to the first charging voltage from the first secondary transformer circuit to form a second charging voltage, wherein the second charging voltage is provided to the at least one battery by means of a second set of terminals defining a second output, wherein the battery charger further comprises a charge control circuit connected to the charging circuit, and wherein the charge control circuit is arranged to identify which one of the first and second outputs the at least one battery is connected to, and wherein the charge control circuit is arranged to identify the which one of the first and second outputs the at least one battery is connected to by communication with the at least one battery.

2. The battery charger according to claim 1, wherein the first charging voltage is of a Safety Extra Low Voltage, SELV, class.

3. The battery charger according to claim 1, wherein the same Volt-Ampere, VA, ratings are used on the first and second outputs of the plurality of secondary transformer circuits as for the primary transformer circuit.

4. The battery charger according to claim 1, wherein the current rating at the first output of the first secondary transformer circuit is the same as the current rating at the second output of the at least one second secondary transformer circuit.

5. The battery charger according to claim 1, wherein the charge control circuit is arranged to identify the which one of the first and second outputs the at least one battery is connected to by sensing where battery voltage is present.

6. The battery charger according to claim 1, wherein the charge control circuit is arranged to use voltage feedback from the at least one second secondary transformer circuit when the at least one battery is identified to be connected to the second output.

7. The battery charger according to claim 1, wherein the battery charger is arranged to keep the voltage level at the first output within a Safety Extra Low Voltage, SELV, level, when the at least one battery is identified to be connected to the second output.

8. The battery charger according to claim 1, wherein the charge control circuit is arranged to use voltage feedback from the first secondary transformer circuit when the at least one battery is identified to be connected to the first output.

9. The battery charger according to claim 1, wherein the charging circuit further comprises regulating means and wherein said regulating means is connected, and shared, between the first secondary transformer circuit and at least one of the said at least one secondary transformer circuit.

10. The battery charger according to claim 9, wherein said shared regulating means is at least one of an output fuse, a safety output control relay and a current shunt.

11. The battery charger according to claim 1, wherein the battery charger is based on AC/DC power conversion.

12. The battery charger according to claim 1, wherein the battery charger is based on DC/DC power conversion.

13. The battery charger according to claim 1, wherein the battery charger is arranged for use with re-chargeable lithium ion batteries.

14. A battery charger, wherein the battery charger includes a charging circuit which comprises:
   a primary transformer circuit connectable to a power source to receive charging current from the power source; and
   a plurality of secondary transformer circuits, wherein at least one of the plurality of secondary circuits is arranged to cooperate with the primary transformer circuit to provide a charging voltage to at least one battery, and wherein the plurality of secondary transformer circuits are connected in series with each other; and wherein
   a first secondary transformer circuit is configured to provide a first charging voltage to the at least one battery by means of a first set of terminals defining a first output, and
   at least one second secondary transformer circuit is configured to provide an additive charging voltage, which is added to the first charging voltage from the first secondary transformer circuit to form a second charging voltage, wherein the second charging voltage is provided to the at least one battery by means of a second set of terminals defining a second output,
   wherein a charge control circuit is connected to the charging circuit and is arranged to identify the which one of the first and second outputs the at least one battery is connected to by communication with the at least one battery.

15. A battery charger, wherein the battery charger includes a charging circuit which comprises:
   a primary transformer circuit connectable to a power source to receive charging current from the power source; and
   a plurality of secondary transformer circuits, wherein at least one of the plurality of secondary circuits is arranged to cooperate with the primary transformer circuit to provide a charging voltage to at least one battery, and wherein the plurality of secondary transformer circuits are connected in series with each other; and wherein
   a first secondary transformer circuit is configured to provide a first charging voltage to the at least one battery by means of a first set of terminals defining a first output, and
   at least one second secondary transformer circuit is configured to provide an additive charging voltage, which is added to the first charging voltage from the first secondary transformer circuit to form a second charging voltage, wherein the second charging voltage is provided to the at least one battery by means of a second set of terminals defining a second output,
   wherein a charge control circuit is connected to the charging circuit and is arranged to identify the which one of the first and second outputs the at least one battery is connected to by sensing where battery voltage is present.

* * * * *